April 8, 1924. 1,489,481
T. BROWN
PLOW
Original Filed Dec. 22, 1919 4 Sheets-Sheet 2
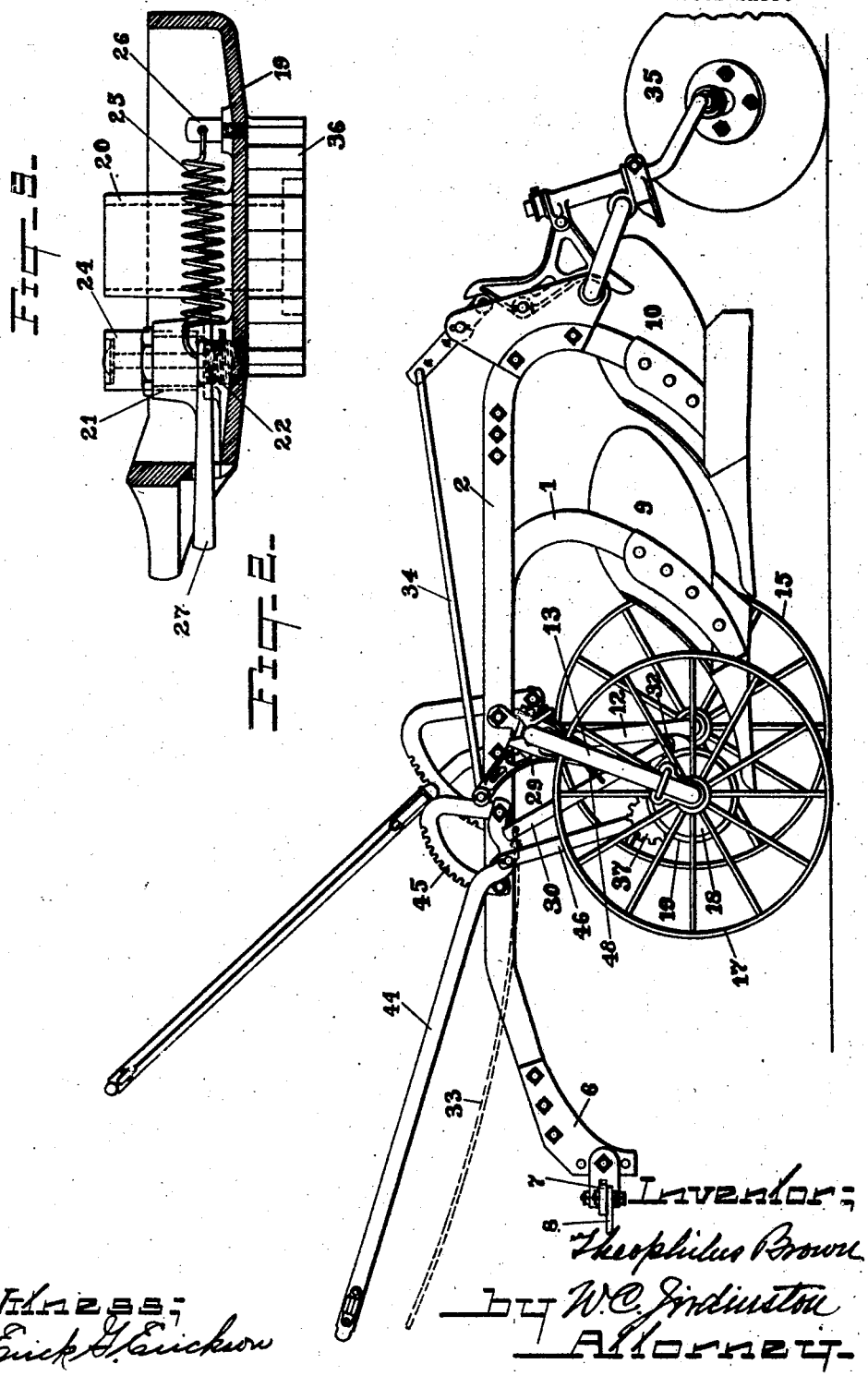

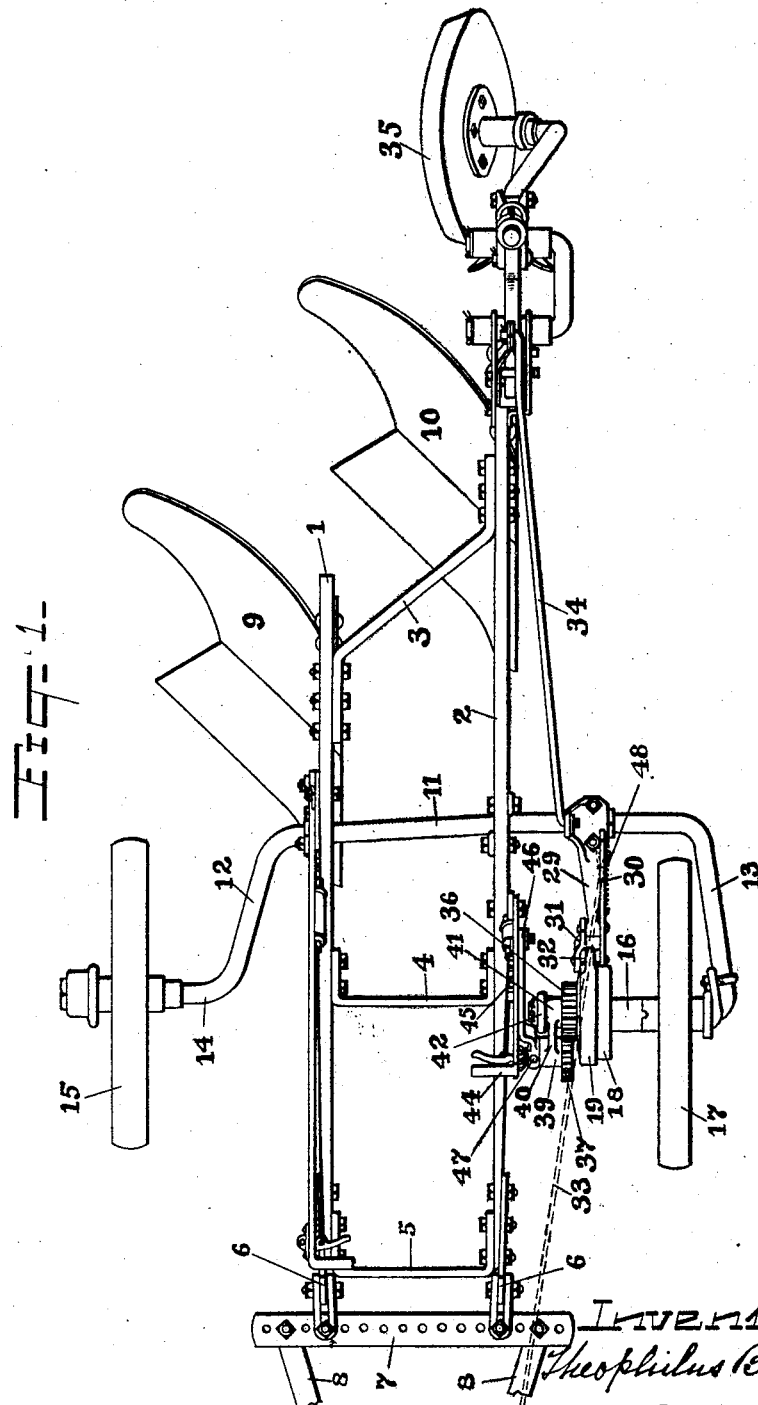

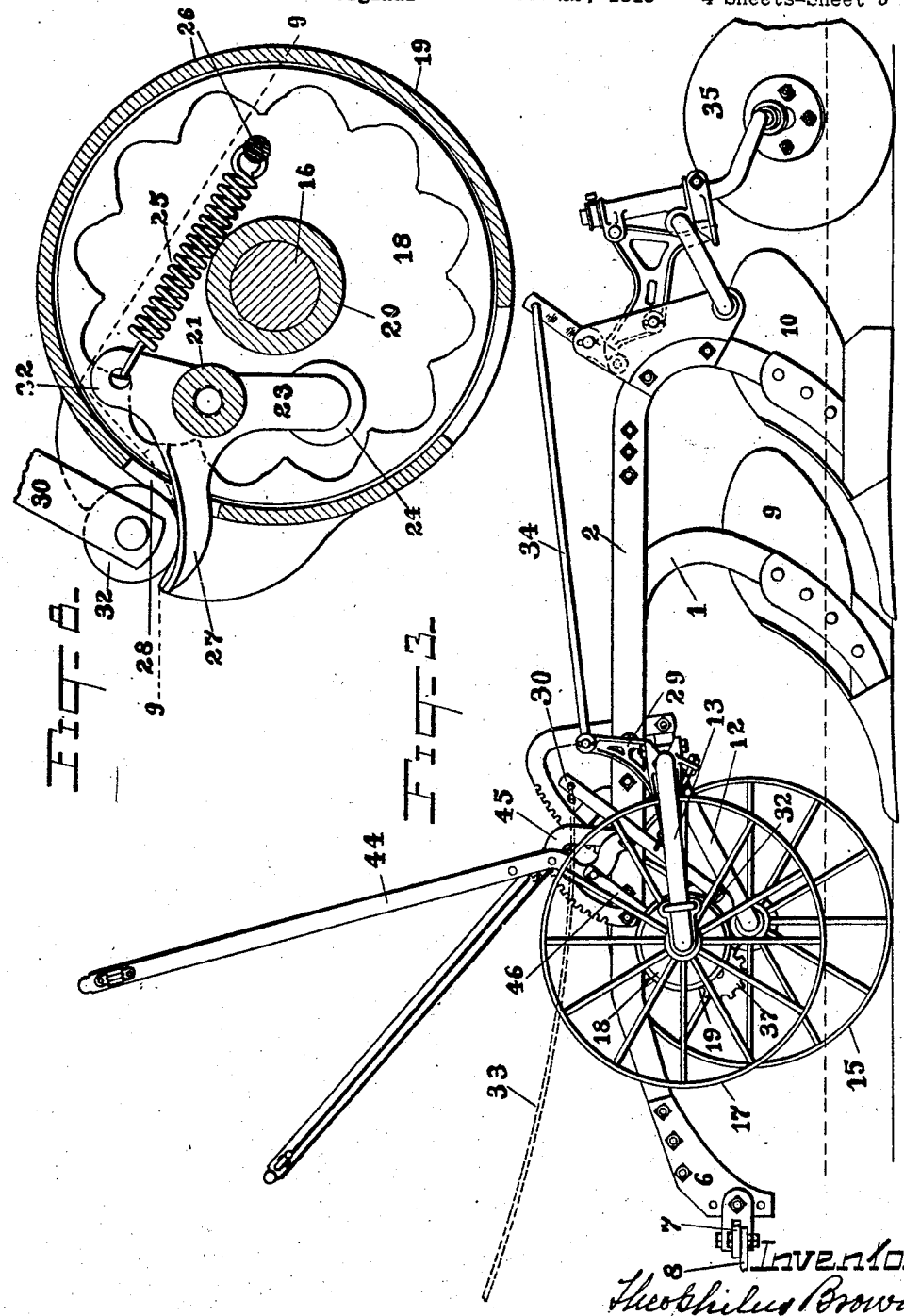

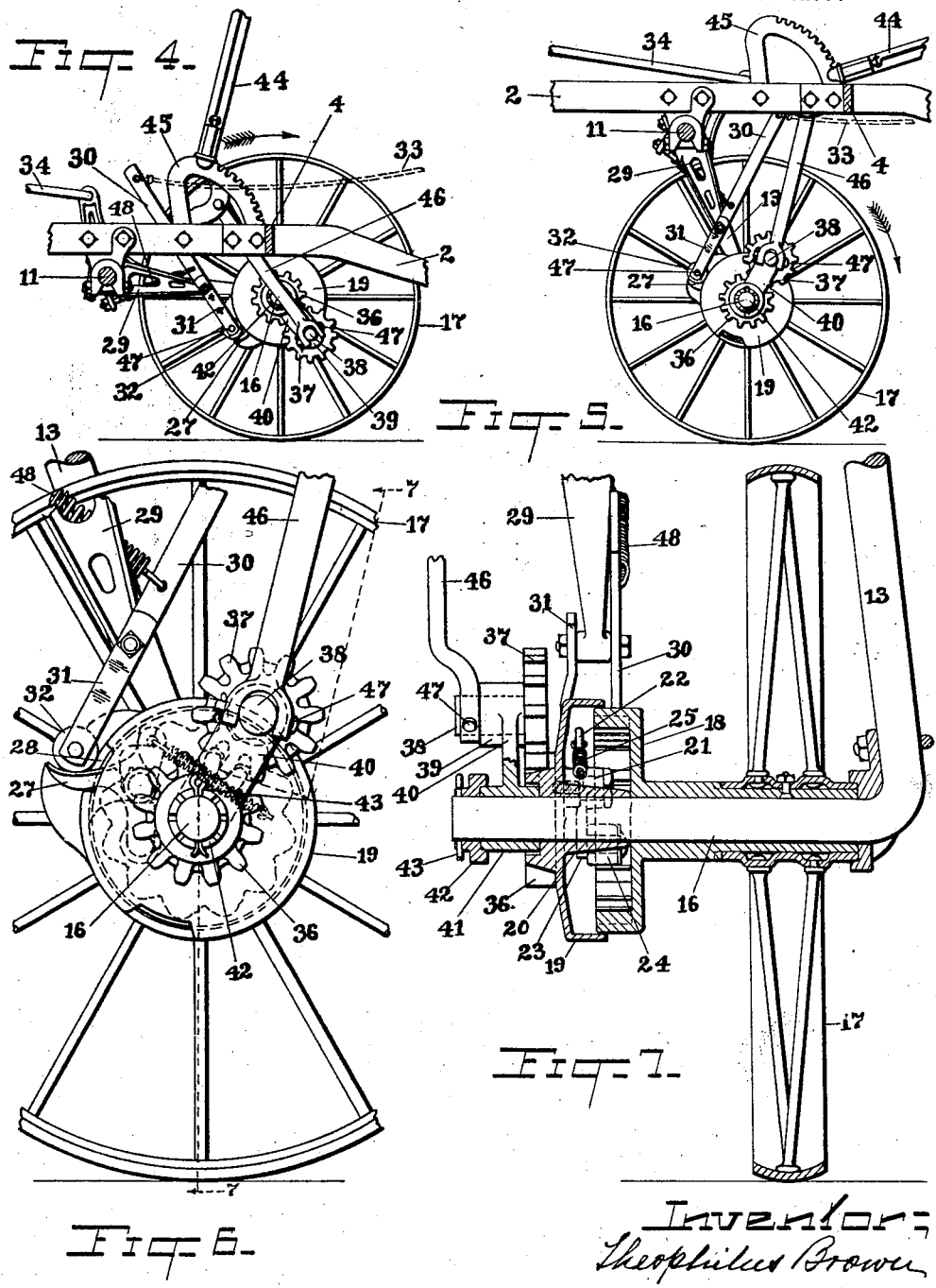

Patented Apr. 8, 1924.

1,489,481

UNITED STATES PATENT OFFICE.

THEOPHILUS BROWN, OF MOLINE, ILLINOIS, ASSIGNOR TO DEERE & COMPANY, OF MOLINE, ILLINOIS, A CORPORATION OF ILLINOIS.

PLOW.

Application filed December 22, 1919, Serial No. 346,613. Renewed March 19, 1923.

*To all whom it may concern:*

Be it known that I, THEOPHILUS BROWN, a citizen of the United States, residing at Moline, in the county of Rock Island and State of Illinois, have invented certain new and useful Improvements in Plows, of which the following is a specification, reference being had therein to the accompanying drawing.

My invention relates to power lift plows, and has for its object to simplify the construction and operation of the power lift mechanism without impairing its efficiency.

Referring to the drawings in which similar numerals indicate identical parts—

Figure 1 is a plan view of a wheeled plow embodying my invention.

Figure 2 is a side elevation with the plow raised.

Figure 3 is a side elevation with the plow lowered into operative position.

Figure 4 is a view of the lifting mechanism taken from the furrowward side of the landwheel and showing the parts in the position they assume when the plow is down.

Figure 5 is a similar view to Figure 4 with the parts in the position they assume when the plow is raised.

Figure 6 is an enlarged view of Figure 5 showing, in dotted lines, the clutch parts.

Figure 7 is a section on the line 7—7 of Figure 6.

Figure 8 is an enlarged detail section illustrating the clutch parts, and

Figure 9 is a section on the line 9—9 of Figure 8.

The frame comprises plow beams 1 and 2 spaced apart and rigidly connected together by braces 3, 4 and 5. A clevis 6 is secured to each beam, and connected to the clevises is a draw bar 7 from which extend draft bars 8 for attachment to a tractor in any desired manner. On the downwardly bent ends of the beams 1 and 2 are mounted plow bodies 9 and 10.

Rockably journaled in bearings on the beams 1 and 2 is an axle having a horizontal portion 11 and downwardly extending portions 12 and 13. The portion 12 terminates in a spindle 14 on which is journaled a furrow wheel 15, and the portion 13 terminates in a spindle 16 extending inwardly toward the frame and having journaled thereon a land wheel 17. The clutch by which the traction power of the wheel 17 is utilized to raise the plow is as follows; the hub of the land-wheel 17 is extended and carries, preferably integral therewith, an annular gear 18 which projects partially within a casing 19, its projection therein being fixed by the hub 20 of the casing 19 contacting with the inner face of the annular gear 18. Within the casing 19, and preferably integral therewith, is a stud 21 upon which is rockably mounted a bellcrank having diametrically opposed arms 22 and 23; on the arm 23 is mounted a roller 24 which is adapted to engage with any one of the notches in the annular gear 18. To the arm 22 is connected one end of a coiled spring 25, the opposite end of which is secured to a stud 26 on the inner face of the casing 19. An arm 27 of the bell crank extends, substantially at a right angle to the arms 22 and 23, through a slot 28 in the periphery of the casing 19 and has a concave face as shown.

Rigidly mounted, intermediate its ends, on the horizontal portion 11 of the axle, is a lever 29 on the lower end of which is pivotally mounted, intermediate its ends, a rocking lever 30. A bar 31 is also pivoted on the lever opposite the lever 29 and between the lower ends of the latter and the end of the bar 31 is mounted a roller 32, which rests normally on the concave face of the arm 27 and holds the bell crank in the position shown in Figure 8 so that the clutch is out of operation and the wheel 17 is free to rotate without affecting the position of the plow; a coiled spring 48 is connected to the lever 30, above its pivot on the lever 29, and extends to connect with the lever 29 and exerts its force to rock the lever 30 so that the roller 32 will engage with the arm 27 of the bell crank. To the upper end of the lever 30 is connected a cable 33 extending forwardly to a tractor to which the plow is connected. A rod 34, connected to the upper end of the lever 29, extends rearwardly to connection with the mechanism by which the rear wheel 35 is controlled in the operation of raising or lowering the plow.

A sun gear 36 is preferably integral with the casing 19 and meshes with a planet gear 37 mounted on a stub shaft 38 journaled in a bearing 39 which is preferably integral with an arm or link 40 extending from a sleeve 41 adapted to turn on the spindle 16. One end of the sleeve 41 extends into a recess in the sun gear as shown in Figure 7, and the opposite end is in a similar recess in a castellated nut 42, on the end of the spindle 16, and which is held in place by a pin or cotter 43 which is inserted in an opening in the end of the spindle 16 and engages with notches in the nut 42.

A hand lever 44 is pivotally mounted on the beam 2 and is provided with the usual form of latch to engage with any one of a series of notches in a sector 45 secured on the beam 2. A link 46 is pivotally connected at one end to the frame by means of the lever 44, between the pivot of the latter and the curve of the sector 45, and projects downwardly to and is pivotally connected with the link 40 by means of the stub shaft 38, its lower end being bifurcated for reception of the end portion of the stub shaft 38 to which the link is secured by a bolt or pin 47.

Presuming that the plow is down and in operation, and it is desired to raise it, the lever 30 is rocked by a pull on the cable 33 releasing the roller 32 from the arm 27 of the bell crank; upon this action the bell crank is rocked by the tension of the spring 25 and the roller 24 enters the adjacent notch in the annular gear 18 locking the latter and the casing 19 together so that they rotate with the wheel 17. The sun gear 36 being integral with the casing 19 accordingly rotates with the land wheel.

The planet gear 37 does not rotate, but as it meshes with the sun gear 36, it is carried orbitally about said gear as the latter rotates with the wheel 17, thereby causing the lower end of the link 46 to revolve about the axis of the clutch members at half speed, and rocking the crank axle 13 to lift the plow frame. This movement continues until the arm 27 and roller 32 again contact to rock the bell crank and disengage the roller 24 from a notch in the annular gear 18; at this time operation of raising the plow is complete and the parts are as shown in Figures 2, 5, 6, 7 and 8, the planet gear 37 being forward of the axis of the wheel 17, and the arm 27 of the bell crank, with which the roller 32 is in contact, being rearward of the axis of the wheel 17. As before stated the sun gear is preferably integral with the casing 19 and the bell crank is pivotally mounted on the casing 19, and as the planet gear 37, in mesh with the sun gear 36, does not rotate, it follows that when the plow is raised and the parts are in position, as shown and described, the plow is locked in a raised position, and as the pivots of the links 40 and 46 are then substantially in alinement with the axis of the land wheel, the weight of the frame is sustained by the lifting devices.

To lower the plow a pull upon the rope or cable 33 rocks the lever 30, freeing the arm 27 of the bell crank from the roller 32, and the plow drops to the ground, the movement being so rapid that the roller 24 does not engage with any one of the notches in the annular gear 18 until the plow contacts with the ground, whereupon the roller 24 engages with the adjacent notch in the annular gear 18 so that the traction power of the wheel 17 becomes operative to force the plow into the ground until the arm 27 again engages with the roller 32 on the lever 30, rocking the bell crank and separating the clutch parts so that the wheel 17 is free to rotate without its traction power being employed.

In the operation of raising the plow as just described, the planet gear 37 travels half way around the sun gear while the land wheel is making one complete revolution; in other words its orbital travel around the sun gear is at a rate of speed approximately one half the speed of revolution of the sun gear 36 and the landwheel 17, consequently the plow is raised by a complete revolution of the landwheel 17 while the planet gear 37 travels only half way around the sun gear until its orbital movement is stopped by the separation of the clutch parts through which the traction power of the landwheel 17 is transmitted. By means of the lever 44 the effective point of connection of the lifting devices with the frame may be adjusted to regulate the depth of plowing.

As shown in the drawings the axle rocks to swing forwardly when the plow is lowered and swings rearwardly simultaneously with raising the plow, and the axis of the landwheel 17 is rearward of the axis of the furrowwheel 15; I do not limit myself to this construction however, although I find it to be preferable.

What I claim is—

1. In a plow of the class described, the combination of a beam frame, a plow body carried thereby, ground wheels for supporting said frame one on the land side and one on the furrow side, the frame being vertically adjustable relatively to the said wheels, a clutch for transmitting frame-lifting power comprising a continually going element at the axis of and driven by one of the ground wheels, and an intermittingly acting positively rotating element at the axis of said ground wheel, a link having its lower end arranged to rotate around the axis of said ground wheel and adapted to transmit power to the frame, and a gear wheel mounted in fixed relation to said ground wheel and actuated by the intermittingly driven part of the clutch and a reducing gear wheel driven by the aforesaid gear and supported independently of the beam frame and connected to the said link.

2. In a plow of the class described, the combination of a beam frame, a plow carried thereby, ground wheels for supporting said frame, two inclined crank arms rockably mounted on the frame and respectively carrying said wheels at their lower ends, a power-transmitting mechanism which comprises a continually going element driven by a ground wheel and an intermittingly acting optionally rotating element both supported on the crank of the last said ground wheel and mounted at the axis of said wheel, a gear wheel also at the axis of said ground wheel and actuated by the intermittingly acting clutch element, a second gear wheel meshing with the aforesaid gear wheel and reducing its speed, a rotary carrier for the second gear wheel carried by the lower end of the crank and a link arranged to bear against the frame and connected to said carrier at the axis of said second gear wheel.

3. In a wheeled plow, in which the traction power of one of the wheels to raise the plow is utilized through means connected at will with said wheel, said means including with said wheel and its axle the combination of a clutch having one of its members in constant connection with said wheel to rotate therewith, a second member loosely mounted on the axle and having a gear rigid therewith, means to connect said clutch members for simultaneous rotation, a non-rotating gear supported on the axle in constant mesh with the gear on the clutch member and adapted to move orbitally about said gear, and a link connected with the non-rotating gear and the plow.

4. In a wheeled plow, in which the traction power of one of the wheels is utilized to raise the plow through means connected at will with said wheel, said means including a crank axle on which said wheel is journaled, the combination of a clutch having one of its members in constant connection with said wheel to rotate therewith, a second member loosely mounted on the axle and having a gear rigid therewith, means to connect said clutch members for simultaneous rotation, a support loosely journaled on the axle and carrying a non-rotating gear in constant mesh with the gear on the clutch member, and a link connected with said non-rotating gear and the plow, said non-rotating gear adapted to move orbitally about the gear on the clutch member in the operation of raising the plow.

5. In a plow, the combination of a plow carrying frame, a rear furrowwheel, a rockable crank axle on the frame, a front furrowwheel and a landwheel on said axle, a clutch having one of its members permanently connected with the landwheel, a gear forming part of a second clutch member loosely mounted on the axle, a non-rotatable gear supported on the axle in mesh with the gear on the clutch member, a link connected with the non-rotating gear and the frame, and means to connect the clutch members and raise the plow by the traction power of the landwheel, the non-rotatable gear moving orbitally about the gear on the clutch member.

6. In a plow, the combination of a plow carrying frame, a rear furrowwheel, an axle, a front furrowwheel and a landwheel journaled on the axle, a clutch having one of its members permanently connected with the landwheel, a second clutch member loosely carried on the axle and including a gear, a non-rotatable gear supported on the axle and in mesh with the gear on the clutch member, a link connected with the non-rotatable gear and the frame, and means to operate the clutch whereby said gears are actuated by the traction power of the landwheel, the non-rotatable gear moving orbitally about the gear on the clutch member and raising the plow through its connection therewith.

7. In a plow, the combination of a plow carrying frame, supporting wheels therefor, a train of gears interposed between one of said wheels and the frame, a clutch operable at will to actuate said gears by rotation of the wheel, said train including a gear permanently connected to a part of the clutch and in mesh with a non-rotating gear, said non-rotating gear having an orbital movement about the gear on the clutch part when the clutch is operated, and a connection between said non-rotating gear and the frame whereby the plow is raised by the traction power of said wheel when the clutch is operated.

8. In a plow, the combination of a plow carrying frame, supporting wheels therefor, a train of gears interposed between one of said wheels and the frame, a clutch operable at will to actuate said gears by rotation of the wheel, said train including a gear permanently connected to a part of the clutch and in mesh with a non-rotating gear, said non-rotating gear having an orbital movement about the gear on the clutch part when the clutch is operated to raise the plow, a connection between said non-rotating gear and the frame whereby the plow is raised by a complete revolution of the said wheel and one half the orbital movement of the non-rotating gear.

9. In a plow of the class described, the combination of a beam frame, a plow body carried thereby, ground wheels for supporting said frame, one on the land side and one on the furrow side, the frame being vertically adjustable relatively to said wheels, and means for lifting said frame comprising a link optionally actuated by power derived from one of said ground wheels, and a link pivotally connected with said link and with the frame, the pivots of said links being arranged to move substantially into dead center relation to each other and to the axis of said ground wheel when the frame is lifted, whereby said lifting means acts to sustain the weight of the lifted frame.

10. In a plow of the class described, the combination of a beam frame, a plow body carried thereby, ground wheels for supporting said frame, one on the land side and one on the furrow side, the frame being vertically adjustable relatively to said wheels, coacting clutch members for transmitting power from one of said ground wheels to lift the frame, a link, means comprising intermeshing gears for optionally causing one end of said link to rotate about the axis of said clutch members, and means connecting the other end of said link with said frame.

11. In a plow of the class described, the combination of a beam frame, a plow body carried thereby, ground wheels for supporting said frame, one on the land side and one on the furrow side, the frame being vertically adjustable relatively to said wheels, coacting clutch members for transmitting power from one of said ground wheels to lift the frame, a link, means comprising intermeshing gears for optionally causing one end of said link to rotate about the axis of said clutch members, and a lever mounted on the frame and connected with said link for adjustably connecting the other end thereof with said frame.

THEOPHILUS BROWN.